US010600234B2

(12) United States Patent
Herman et al.

(10) Patent No.: US 10,600,234 B2
(45) Date of Patent: Mar. 24, 2020

(54) INTER-VEHICLE COOPERATION FOR VEHICLE SELF IMAGING

(71) Applicant: Ford Global Technologies, LLC, Dearborn, MI (US)

(72) Inventors: David Michael Herman, Southfield, MI (US); David A. Herman, Southfield, MI (US); David Joseph Orris, Southgate, MI (US); Nicholas Alexander Scheufler, Flat Rock, MI (US); Nunzio DeCia, Northville, MI (US); Stephen Jay Orris, Jr., New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/846,152

(22) Filed: Dec. 18, 2017

(65) Prior Publication Data

US 2019/0188901 A1  Jun. 20, 2019

(51) Int. Cl.
*G06T 15/20* (2011.01)
*H04N 13/275* (2018.01)
(Continued)

(52) U.S. Cl.
CPC ............... *G06T 15/20* (2013.01); *B60R 1/00* (2013.01); *G06T 3/4038* (2013.01); *G06T 19/003* (2013.01); *H04N 5/247* (2013.01); *H04N 13/275* (2018.05); *B60R 2300/302* (2013.01); *B60R 2300/303* (2013.01);
(Continued)

(58) Field of Classification Search
None
See application file for complete search history.

(56) References Cited

U.S. PATENT DOCUMENTS 5,617,490 A  4/1997 Kume
5,717,390 A  2/1998 Hasselbring
(Continued)

FOREIGN PATENT DOCUMENTS

CN  106683139 A  5/2017
CN  107226087 A  10/2017
(Continued)

OTHER PUBLICATIONS

Mitra, Niloy J. et al., "Estimating Surface Normals in Noisy Point Cloud Data," International Journal of Computational Geometry & Applications, pp. 261-276, vol. 14, 2004, 16 pages.
(Continued)

*Primary Examiner* — Yanna Wu
(74) *Attorney, Agent, or Firm* — Frank Lollo; Eversheds Sutherland (US) LLP (57) ABSTRACT

Method and apparatus are disclosed for inter-vehicle cooperation for vehicle self imaging. An example vehicle includes an inter-vehicle communication module and a infotainment head unit. The infotainment head unit determines a pose of the vehicle and, in response to receiving an input to generate a composite image, broadcasts a request for images of the vehicle. The request message includes the pose. The infotainment head unit also generates the composite image of the vehicle based on the images and display the composite image on a display.

15 Claims, 4 Drawing Sheets

(51) Int. Cl.
*G06T 19/00* (2011.01)
*G06T 3/40* (2006.01)
*B60R 1/00* (2006.01)
*H04N 5/247* (2006.01)
*H04L 29/08* (2006.01)

(52) U.S. Cl.
CPC ..... *B60R 2300/50* (2013.01); *B60R 2300/602* (2013.01); *G06T 2200/32* (2013.01); *H04L 67/12* (2013.01)

(56) References Cited

U.S. PATENT DOCUMENTS

| | | | |
|---|---|---|---|
| 6,587,597 B1* | 7/2003 | Nakao | H04N 5/232 348/139 |
| 7,586,489 B2 | 9/2009 | Muller-Fischer | |
| 8,228,380 B2 | 7/2012 | Hardee et al. | |
| 8,473,196 B2 | 6/2013 | Basnayake | |
| 8,817,101 B2 | 8/2014 | Hanisch | |
| 9,135,754 B2 | 9/2015 | Ng-Thow-Hing | |
| 9,165,219 B2 | 10/2015 | Chen | |
| 9,311,818 B2 | 4/2016 | Lin et al. | |
| 9,324,201 B2 | 4/2016 | Jun | |
| 9,424,725 B1 | 8/2016 | Keohane | |
| 9,440,627 B2 | 9/2016 | Kurtovic et al. | |
| 9,477,894 B1 | 10/2016 | Reed et al. | |
| 9,547,912 B2 | 1/2017 | Kotz et al. | |
| 9,558,667 B2 | 1/2017 | Bowers | |
| 9,672,440 B2 | 6/2017 | Saward | |
| 9,762,880 B2 | 9/2017 | Pflug | |
| 9,784,887 B1 | 10/2017 | Ulmer | |
| 9,813,619 B2 | 11/2017 | An | |
| 9,928,544 B1* | 3/2018 | Hasan | G06Q 30/0643 |
| 2002/0130953 A1 | 9/2002 | Riconda | |
| 2003/0212567 A1 | 11/2003 | Shintani et al. | |
| 2009/0231469 A1* | 9/2009 | Kato | H04N 5/235 348/234 |
| 2011/0218896 A1 | 9/2011 | Tonnon | |
| 2013/0103305 A1 | 4/2013 | Becker et al. | |
| 2013/0342333 A1* | 12/2013 | Hutchings | G08G 1/096791 340/435 |
| 2014/0324247 A1 | 10/2014 | Jun | |
| 2015/0054716 A1 | 2/2015 | Hirabayashi | |
| 2015/0054934 A1 | 2/2015 | Haley | |
| 2015/0134675 A1 | 5/2015 | Ellis | |
| 2016/0153778 A1 | 6/2016 | Singh et al. | |
| 2016/0325741 A1 | 11/2016 | Furst | |
| 2016/0371968 A1 | 12/2016 | Almansour | |
| 2017/0011378 A1 | 1/2017 | Inoue | |
| 2017/0195564 A1 | 7/2017 | Appia | |
| 2017/0261336 A1 | 9/2017 | Schmidt | |
| 2017/0300761 A1 | 10/2017 | Chaney, Jr. et al. | |
| 2017/0374502 A1 | 12/2017 | Gabel | |
| 2018/0001814 A1 | 1/2018 | Salter | |
| 2018/0027224 A1 | 1/2018 | Javidnia | |
| 2018/0032829 A1 | 2/2018 | Kim | |
| 2018/0219643 A1* | 8/2018 | Naka | H04B 1/7083 |
| 2018/0290594 A1 | 10/2018 | Abdel-Rahman | |
| 2018/0321905 A1 | 11/2018 | Fountaine | |
| 2019/0244324 A1* | 8/2019 | Watanabe | G06T 1/00 |

FOREIGN PATENT DOCUMENTS

| | | |
|---|---|---|
| DE | 102009031319 A1 | 1/2011 |
| DE | 102016212181 A1 | 1/2018 |
| EP | 1462762 A1 | 9/2004 |
| JP | 2005005978 A | 1/2005 |
| JP | 2005209079 A | 8/2005 |
| JP | 2017068640 A | 4/2017 |
| KR | 101760312 B1 | 7/2017 |

OTHER PUBLICATIONS

Han, Xian-Feng et al., "A Review of Algorithms for Filtering the 3D Point Cloud," Signal Processing: Image Communication, pp. 103-112 2017, 10 pages.

Besl, Paul J., et al., *A Method for Registration of 3-D Shapes*, IEEE Trans. on Pattern Analysis and Machine Intelligence, 1992, 14 (2): 239-256, IEEE Computer Society: Los Alamitos, CA, USA, 18 pages.

Brailean, James C., et al., *Noise Reduction filters for dynamic image sequences: A review*, Proceedings of the IEEE, 1995, 83.9: 1272-1292, 21 pages.

Buades, Antoni, et al., *Multi image noise estimation and denoising*, 2010, 29 pages.

Carceroni, Rodrigo, et al., *Structure from motion with known camera positions*, Computer Vision and Pattern Recognition, 2006, IEEE Computer Society Conference on vol. 1, 10 pages.

Chen, H., et al., *3D free-form object recognition in range images using local surface patches*, 2007, Pattern Recognition Letters, vol. 28, No. 10. 4 pages.

Chwa, Dongkyoung, et al., *Camera motion estimation for 3-D structure reconstruction of moving objects*, 2012 IEEE International Conference on Systems, Man, and Cybernetics (SMC), 6 pages.

Crandall, David J., et al. *SfM with MRFs: Discrete-Continuous Optimization for Large-Scale Structure from Motion*, IEEE Transactions on Pattern Analysis & Machine Intelligence, 2013, vol. 35, No. 12, 14 pages.

Dekeyser, Fabien, et al. *Restoration of noisy, blurred, undersampled image sequences using a parametric motion model*, 2000, Proc. of the ISIVC, 14 pages.

Dubois, Eric et al., *Noise reduction in image sequences using motion-compensated temporal filtering*, 1984, IEEE transactions on communications 32.7, 7 pages.

Nilosek, David et al., *Assessing geoaccuracy of structure from motion point clouds from long-range image collections*, Optical Engineering, 2014, 53.11, 11 pages.

Papazov, Chavdar, et al., *An efficient ransac for 3d object recognition in noisy and occluded scenes*, Asian Conference on Computer Vision, 2010, Springer, Berlin, Heidelberg, 14 pages.

Rosman, Guy, et al., *Patch-Collaborative Spectral Point-Cloud Denoising*, Computer Graphics Forum, 2013, vol. 32, No. 8, 12 pages.

Tombari, F., et al. *Object recognition in 3D scenes with occlusions and clutter by Hough voting*, 2010, 4th Pacific-Rim Symposium on Image and Video Technology, 7 pages.

Badrinarayanan, Vijay et al., SegNet: A Deep Convolutional Encoder-Decoder Architecture for Image Segmentation, Oct. 2016, 14 pages.

Brostow, Gabriel J., Segmentation and Recognition using Structure from Motion Point Clouds, 2008, 14 pages.

Chen, Liang-Chi EH et al., DeepLab: Semantic Image Segmentation with Deep Convolutional Nets, Atrous Convolution, and Fully Connected CRFs, May 2017, 14 pages.

Eigen, David et al., Depth Map Prediction From a Single Image Using a Multi-Scale Deep Network, 2014, 9 pages.

Finlayson, Graham, Detecting Illumination in Images, 2007, 8 pages.

Girdhar, Rohit et al., Learning a Predictable and Generative Vector Representation for Objects, Springer International Publishing, 2016, 26 pages.

Hui, Tak-Wai et al., Depth Map Super-Resolution by Deep Multi-Scale Guidance, Springer International Publishing, 2016, 17 pages.

Izadi, Shahram, KinectFusion: Real-Time 3D Reconstruction and Interaction Using a Moving Depth Camera, 2011, 10 pages.

Laskowski, Maciej, Detection of Light Sources in Digital Photographs, 2007, 6 pages.

Lin, Guosheng et al., RefineNet: Multi-Path Refinement Networks for High-Resolution Semantic Segmentation, Nov. 2016, 11 pages.

Lin, Shu-Chin et al., Filling Holes in 3D Scanned Model Base on 2D Image Inpainting, 2017, 6 pages.

Long, Jonathan et al., Fully Convolutional Networks for Semantic Segmentation, Mar. 2015, 10 pages.

Marton, Zoltan Csaba, On Fast Surface Reconstruction Methods for Large and Noisy Point Clouds, 2009, 6 pages.

Nguyen, Anh, 3D Point Cloud Segmentation: A Survey, 2013, 6 pages.

(56) References Cited

OTHER PUBLICATIONS

Pauly, Mark, Efficient Simplification of Point-Sampled Surfaces, 2002, 8 pages.
Peng Chao et al., Large Kernel Matters—Improve Semantic Segmentation by Global Convolutional Network, Mar. 2017, 11 pages.
Remondino, Fabio, From Point Cloud to Surface: The Modeling and Visualization Problem, 2003, 11 pages.
Xiang, Yu et al., ObjectNet3D: A Large Scale Database for 3D Object Recognition, 2016, 16 pages.
Yu, Fisher et al., Multi-Scale Context Aggregation by Dilated Convolutions, Apr. 2016, 13 pages.
Zach, Christopher, Fast and High Quality Fusion of Depth Maps, 2008, 8 pages.
Zhang, Yiwei et al., A Fast 3D Reconstruction System With a Low-Cost Camera Accessory, 2015, 7 pages.
Zhao, Hengshuang et al., Pyramid Scene Parsing Network, Apr. 2017, 11 pages.
Zhu, Zhuotun et al., Deep Learning Representation using Autoencoder for 3D Shape Retrieval, 2016, 6 pages.

\* cited by examiner

INTER-VEHICLE COOPERATION FOR VEHICLE SELF IMAGING

TECHNICAL FIELD

The present disclosure generally relates to vehicle-to-vehicle communication and, more specifically, inter-vehicle cooperation for vehicle self imaging.

BACKGROUND

Individuals are interested in documenting their lives via pictures (sometimes referred to as a "selfie"). However, documenting the driving experience while the driver is in the vehicle traditionally requires mobile equipment such as a drone or a helicopter and extensive planning. Increasingly, vehicles and stationary infrastructure objects include cameras or other sensors (such as LiDAR, etc.) and are capable of communicating with vehicles through inter-vehicle communication. This inter-vehicle communication network is sometimes referred to as vehicle-to-vehicle (V2V) communication and vehicle-to-infrastructure (V2I) communication (sometimes referred to collectively as V2X communication).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for inter-vehicle cooperation for vehicle self imaging. An example vehicle includes an inter-vehicle communication module and a infotainment head unit. The infotainment head unit determines a pose of the vehicle and, in response to receiving an input to generate a composite image, broadcasts a request for images of the vehicle. The request message includes the pose. The infotainment head unit also generates the composite image of the vehicle based on the images and display the composite image on a display.

A method to generate an image of a host vehicle includes determining, by a processor of the host vehicle, a pose of the host vehicle. The method also includes, in response to receiving an input to generate a composite image, broadcasting, via an inter-vehicle communication module of the host vehicle, a request to target vehicles for images of the host vehicle, the request message including the pose. Additionally, the example method includes generating, with the processor, the composite image of the vehicle based on the images, and displaying, on a display of the host vehicle, the composite image.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Increasingly, vehicles and infrastructure objects (e.g., traffic signals, bridges, police surveillance pods, lamp posts, etc.) include inter-vehicle communication modules that facilitate communication between vehicles, infrastructure, and pedestrians. These vehicles and infrastructure objects also increasingly include and/or have 3rd party support for cameras (e.g., color cameras, monochrome cameras, time-of-flight cameras, stereo cameras, monocular cameras, etc.) and other sensors (e.g., LiDAR, etc.) available to capture images of nearby objects and vehicles. However, the cameras rarely provide images of objects in a scene that is desired by an interested party.

As discussed below, an occupant of a vehicle requests a composite vehicle image using a button on a human-machine interface (HMI), such as the infotainment system of the vehicle and/or an application (such as FordPass) executing on a mobile device (e.g., a smartphone, a smart watch, etc.). In response to the request, the vehicle (sometimes referred to as the "host vehicle"), via an inter-vehicle communication module (sometimes referred to as a "vehicle-to-vehicle (V2V) module" or a "dedicated short range communication (DSRC) module"), broadcasts messages requesting that other vehicles (sometimes referred to as "target vehicles") and/or inter-vehicle communication enabled infrastructure modules (sometimes referred to as "roadside units") capture one or more images of the host vehicle and send the captured images to the host vehicle. As the images are received, the host vehicle progressively generates a composite image using a process of three-dimensional scene stitching, such as a structure from motion technique and/or sensor fusion. The host vehicle judges a quality of the composite image based on the received images and estimates a time in which the composite image will be completed based on a rate of which the vehicle is receiving image from a diverse set of angles, distances, and/or heights. In some examples, the estimated time is affected by motion of the vehicle and the traffic rate in the area of the vehicle. The estimated time is provided to the user. When the composite image is complete (or when the occupant decides to stop the process), the composite image is displayed to the occupant(s) on, for example, a center console display of an infotainment system. Through the HMI, the user may save the composite image (e.g., to memory of the vehicle, to cloud storage, etc.) and delete the composite image. The HMI facilitates the user altering the composition of the composite image (e.g., change the pan, tilt, zoom, and/or camera translation, etc.) and/or the background of the composite image. Additionally, in some examples, the infotainment system facilitates altering (e.g., via predefined visual filters) and posting the composite image to social media. In some examples, the vehicle generates a video using translations (e.g., change the pan, tilt, zoom, etc.) and/or multiple iterations of the composite image.

Figure 1:
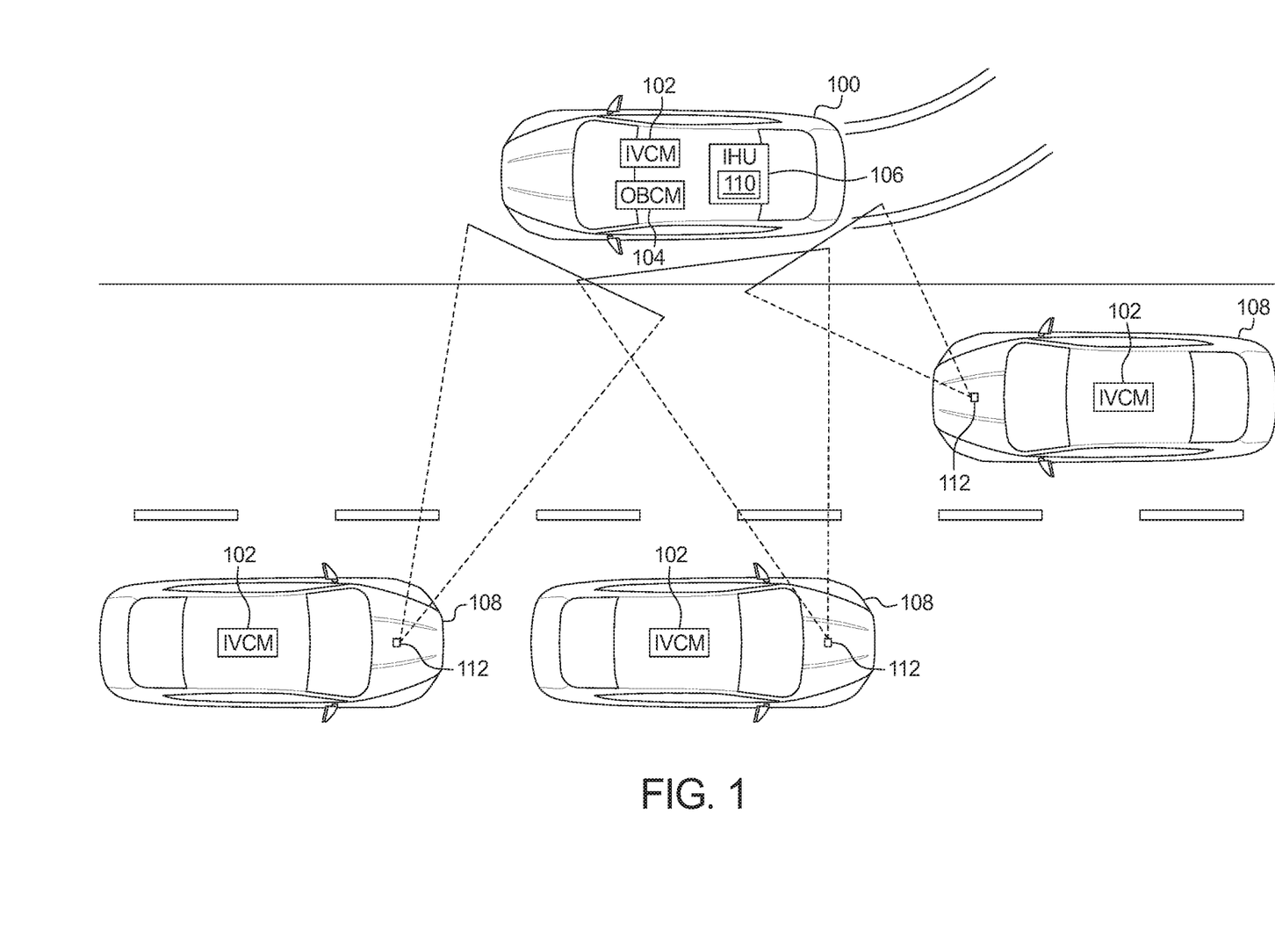
FIG. 1 illustrates a vehicle operating in accordance with this disclosure.

FIG. 1 illustrates a vehicle 100 operating in accordance with this disclosure. The vehicle 100 may be a standard gasoline powered vehicle, a hybrid vehicle, an electric vehicle, a fuel cell vehicle, and/or any other mobility implement type of vehicle. The vehicle 100 may be any type of motor vehicle, such as a car, a truck, a semi-trailer truck, or a motorcycle, etc. Additionally, in some examples, the vehicle 100 is towing a trailer (which, as discussed below, may be treated as part of the vehicle 100). The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). The vehicle may be stationary or in motion during image capture. In the illustrated example the vehicle 100 includes an inter-vehicle communication module (IVCM) 102, an on-board communication module (OBCM) 104, and an infotainment head unit (IHU) 106.

The inter-vehicle communication module 102 includes antenna(s), radio(s) and software to broadcast messages and to establish communication between the host vehicle 100 and target vehicles 108, roadside units (not shown), and mobile device-based modules (not shown). More information on the inter-vehicle communication network and how the network may communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA%20(2011-06-13).pdf), which is hereby incorporated by reference in its entirety along with all of the documents referenced on pages 11 to 14 of the SyRS report. The inter-vehicle communication systems may be installed on vehicles and along roadsides on infrastructure. The inter-vehicle communication systems incorporated into infrastructure (e.g., traffic signals, street lights, municipal cameras, etc.) is known as a "roadside" system or unit. Inter-vehicle communication may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. Inter-vehicle communication systems can be integrated with other systems such as mobile phones.

In some examples, the inter-vehicle communication module 102 implements the Dedicated Short Range Communication (DSRC) protocol. Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

The on-board communications module 104 includes wired or wireless network interfaces to enable communication with external networks. The on-board communications module 104 includes hardware (e.g., processors, memory, storage, antenna, etc.) and software to control the wired or wireless network interfaces. In the illustrated example, the on-board communications module 104 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); local area wireless network (including IEEE 802.11 a/b/g/n/ac or others), and Wireless Gigabit (IEEE 802.11ad), etc.). In some examples, the on-board communications module 104 includes a wired or wireless interface (e.g., an auxiliary port, a Universal Serial Bus (USB) port, a Bluetooth® wireless node, etc.) to communicatively couple with a mobile device (e.g., a smart phone, a smart watch, a tablet, etc.). In such examples, the vehicle 100 may communicated with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols. In some examples, the vehicle 100 communicates with an external server, via the on-board communications module 104 to receive information (e.g., weather, background images, etc.) about a current location of the vehicle 100. For example, the vehicle 100 may request from the external server background images of the vicinity of the vehicle 100 to enhance the composite image generated by the vehicle 100. In some examples, the vehicle 100 receives from the external server a three-dimensional model of the vehicle 100 that is used, at least in part, to provide additional viewing perspectives in the composite image that may not been captured in received images.

The infotainment head unit 106 provides an interface between the vehicle 100 and a user. The infotainment head unit 106 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 106 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 106 displays the infotainment system on, for example, the center console display. In the illustrated example, the infotainment head unit 106 includes an image compositor 110.

The image compositor 110 generates a composite image or three-dimensional model in response to an input by a vehicle occupant. For example, the occupant may touch a virtual button on the infotainment system to activate the system. To initiate generating the composite image, the image compositor 110 determines the pose of the vehicle 100. The pose of the vehicle includes information, such as location, orientation, characteristics (e.g., color, make, model, etc.) that facilitates the target vehicles 108 and/or the roadside units locating and identifying the host vehicle 100. For example, the pose of the vehicle 100 may include global positioning system (GPS) coordinates, direction of travel, and vehicle color. The image compositor 110 broadcasts a request message with the pose information that causes target vehicles 108 and/or roadside units in the vicinity to capture one or more images of the host vehicle 100 with their camera(s) 112.

As the image compositor 110 receives images, it determines an estimated time to generate the composite image. The time is based on the rate at which the image compositor 110 receives images, how diverse the images are (e.g., considering distance, angle, and height, etc.) and/or the estimated traffic conditions in the area, etc. The image compositor 110 causes a representation of the estimated time to be displayed on the infotainment system. Additionally, in some examples, the estimated time takes into account image processing to homogenize images from various sources that have different visual characteristics (e.g., different resolutions, color balances, brightness, color schema, etc.). Additionally, in some examples, the estimated time is affected by a image quality preference (e.g., resolution, size, etc.) specified by the user. For example, if a user desires a high quality image (such as 12 megapixels), the image compositor 110 may estimate more time because requisite high quality images are likely to be received as a lower rate than lower quality images (such as 1 megapixels).

The image compositor 110 locates the host vehicle 100 in the scene using the received images based on the vehicle pose and the estimated orientation of the corresponding camera 112 that captured the images. The image compositor 110 uses feature detection techniques (e.g., a scale-invariant feature transform (SIFT) technique, a speeded up robust features (SURF) technique, convolution neural network for semantic segmentation or feature detection, visual simultaneous localization and mapping (vSLAM), etc.) and/or image segmentation to compared and contrast features in the images to confirm the approximate vector, position and orientation of the cameras 112 that captured the images. In some examples, available high resolution images of the area and three dimensional mapping of the scene (e.g., from an external server, etc.) based on the position of the host vehicle 100 are also used to help locate the cameras 112 in space relative to the host vehicle 100. Using semantic segmentation of current images and past data collections, transitory objects can be removed from the scene(s) when desired enable the image compositor 110 to use historical and present day received images to generate the composite image. Using a structure of motion technique, feature points of the host vehicle 100 are identified in the received images. The image compositor 110 uses the positioning of the feature points and a three dimensional model of the host vehicle 100 to stitch at least portions of the images together to create the composite image of the host vehicle 100. Example structure from motion techniques are described in Crandall, David J., et al. "SfM with MRFs: Discrete-continuous optimization for large-scale structure from motion." *IEEE transactions on pattern analysis and machine intelligence* 35.12 (2013): 2841-2853, which is incorporated by reference in its entirety.

The image compositor 110 determines whether enough images have been received to generate the composite image. In some examples, enough images have been received when there are images to complete a viewable angle of the host vehicle 100. The image compositor 110 will continue to broadcast the request message when enough images have not been received. In some examples, the image compositor 110 notifies the user that the image cannot be completed when enough images have not been received in a threshold period of time.

When the composite image is complete, the image compositor 110 displays the composite image via the infotainment system and/or a mobile device of the user that is communicatively coupled to the vehicle 100. In some examples, the image compositor 110 displays the composite image as it is being generate such that a user can see the progress of the composite image as new images are received and processed. In some examples, using the composite image layered onto the model of the host vehicle 100, the image compositor 110 facilitates altering the composition of the composite image (e.g., angle of a virtual camera, etc.). In some examples, using images received from an external server, the image compositor 110 facilitates a user changing a background of the composite image. For example, when the host vehicle 100 is parked at a scenic view point, the image compositor 110 may download a background image to use in the composite image. In such an examples, the image compositor 110 may select an available background image that depicts the scenic viewpoint on a sunny day when the actual weather is overcast. Additionally, in some examples, the image compositor 110 uses deep photo style transfer to alter the scene in the composite image. Alternatively, in some examples, the image compositor 110 may use upload the composite image to the external server to have the composite image processed to change the context of the scene.

Figure 2:
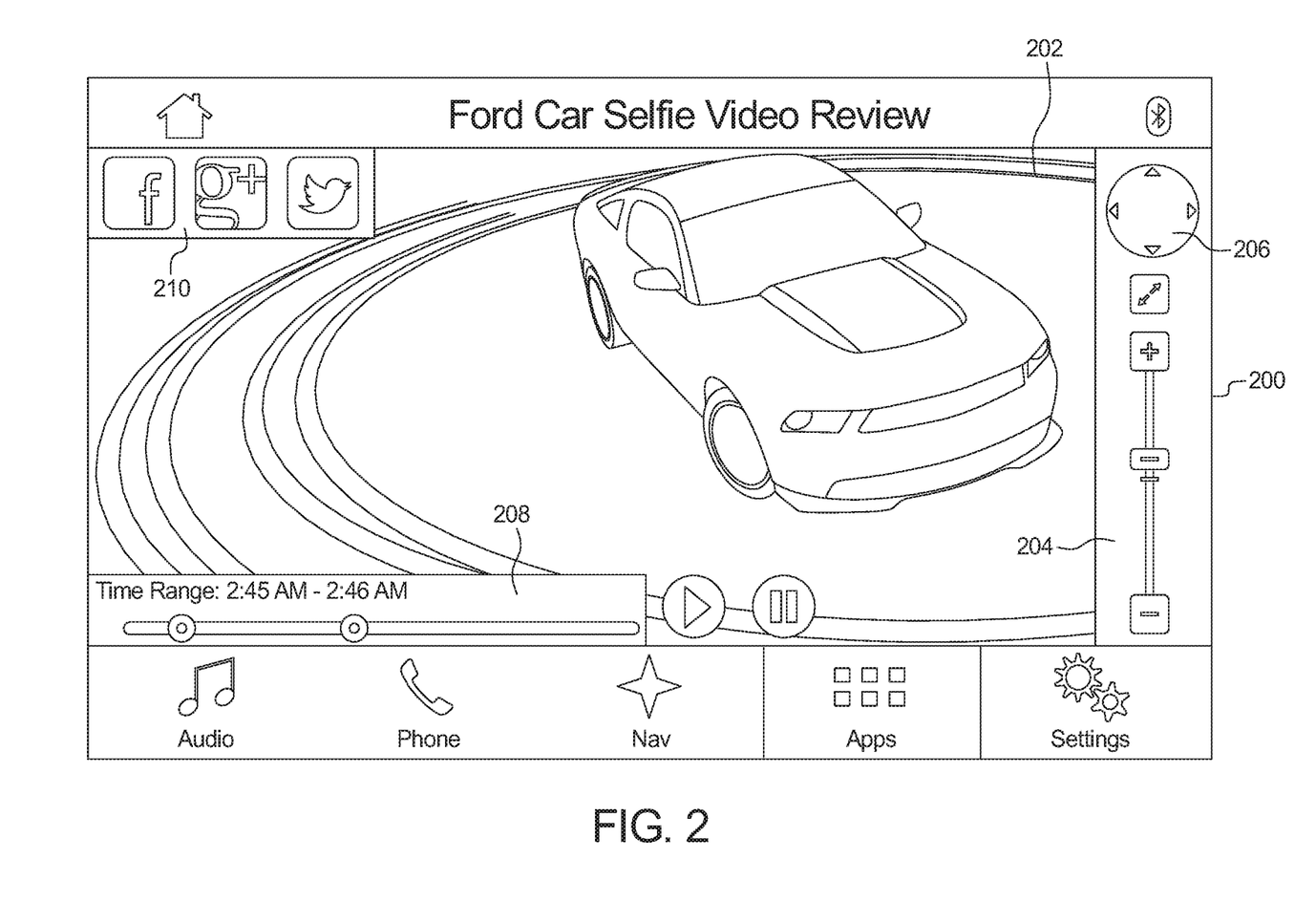
FIG. 2 illustrates an example human machine interface to display and manipulate the composite image.

FIG. 2 illustrates an example human machine interface (HMI) 200 to display and manipulate the composite image 202. In some examples, the HMI 200 is displayed on a console of the infotainment head unit 106. Additionally or alternatively, in some examples, the HMI 200 is displays on a screen of a mobile device via an application executing on the mobile device. In the illustrated example, the user interacts with the HMI 200 via a touch screen interface. The HMI 200 depicts the composite image 202 as generate by a virtual camera that is used to define the rendering parameters of the composite image 202. In some examples, using a three-dimensional model of the vehicle 100, the image compositor 110 generates a three dimensional scene with the received images composited onto the model and, in some example, downloaded images to serve as a background of the scene. The HMI 200 facilitates the user changing the scene (e.g., changing the location of the virtual camera, the composition of the background, etc.). In the illustrated example, the HMI 200 includes a zoom tool 204, a pan tool 206, a image composite adjustment tool 208, and a social media tool 210.

The zoom tool 204 facilitates changing a draw distance by changing the position of the virtual camera. The pan tool 206 facilitates a user changing an orientation of a viewport of the virtual camera to change the portion of the scene that is rendered in the composite image 202. The image composite adjustment tool 208 (a) adjusts an timeframe from which to use images in the composite image and/or (b) adjust a timeframe from which to use images to generate a video of the scene. For example, when the vehicle 100 is moving, the image composite adjustment tool 208 may be used to specify a timeframe from which to use received images to generate a sequential set of composite images 202 to be appended together to form a video. The social media tool facilitates uploading the composite image 202 to social media and/or applying post-render filters to the composite image 202.

Figure 3:
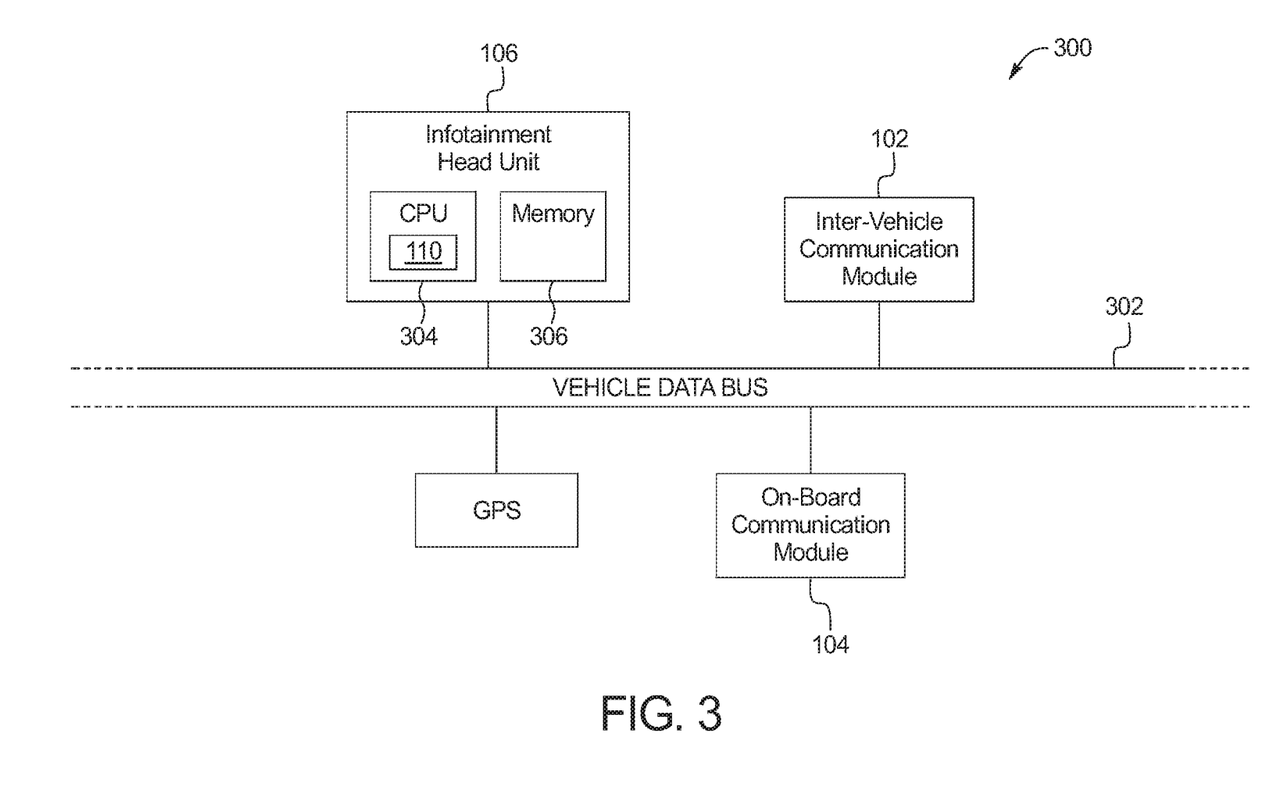
FIG. 3 is a block diagram of electronic components of the vehicle of FIG. 1.

FIG. 3 is a block diagram of electronic components 300 of the vehicle 100 of FIG. 1. In the illustrated example, the electronic components 300 include the inter-vehicle communication module 102, the on-board communications module 104, the infotainment head unit 106, and a vehicle data bus 302.

In the illustrated example, the infotainment head unit 106 includes a processor or controller 304 and memory 306. In the illustrated example, the infotainment head unit 106 is structured to include the image compositor 110. Alternatively, in some examples, the image compositor 110 may be incorporated into another electronic control unit (ECU) with its own processor and memory (such as on-board computing platform, etc.). The processor or controller 304 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 306 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 306 includes multiple kinds of memory, particularly volatile memory and non-volatile memory.

The memory 306 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 306, the computer readable medium, and/or within the processor 304 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 302 communicatively couples the inter-vehicle communication module 102, the on-board communications module 104, and the infotainment head unit 106. In some examples, the vehicle data bus 302 includes one or more data buses. The vehicle data bus 302 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
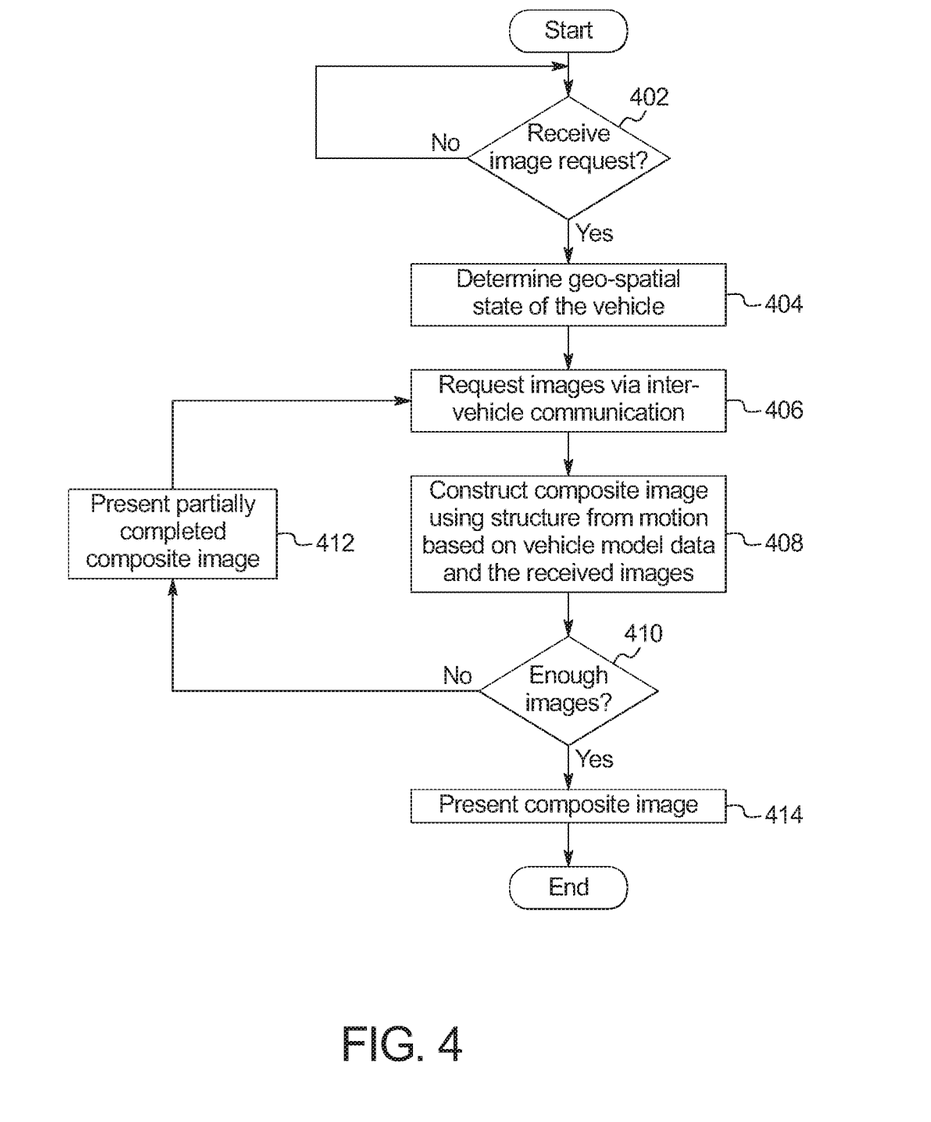
FIG. 4 is a flowchart of a method to construct a composite image using images received via inter-vehicle communication, which may be implemented by the electronic components of FIG. 3.

FIG. 4 is a flowchart of a method to construct a composite image 202 using images received via inter-vehicle communication, which may be implemented by the electronic components 300 of FIG. 3. Initially, at block 402, the image compositor 110 waits until a request has been received to generate a composite image 202 (e.g., via the infotainment system). When such as request has been received, at block 404, the image compositor 110 determines characteristics of the host vehicle 100 to determine a geo-spatial orientation of the host vehicle 100 used to facilitate the target vehicles 108 and/or roadside units determining the relative location of the host vehicle 100. At block 406, the image compositor 110 broadcasts a message via inter-vehicle communication requesting images. At block 408, the image compositor constructs a composite image 202 of the vehicle 100 based on the received images based on a structure from motion algorithm. In some examples, the image compositor 110 uses structure of motion techniques.

At block 410, the image compositor 110 determines whether enough images have been received. In some examples, the image compositor 110 using a model of the host vehicle 100, determines what percentage of the surface of the host vehicle 100 is stitched into the composite image 202 considering the pose of the vehicle 100. For example, when the location of the host vehicle 100 indicates that the host vehicle 100 is parked alongside the road so that likely one side of the host vehicle 100 is not visible, the image compositor 110 may use an expected coverage at that location to determine whether enough images have been received. When the image compositor 110 determines that enough images have not been received, the method continues at block 412. Otherwise, when the image compositor 110 determines that enough images have been received, the method continues at block 414.

At block 412, the image compositor 110 presents the partially completed composite image 202 to the occupants via the infotainment system. At block 414, the image compositor 110 presents the composite image 202 to the occupants via the infotainment system and/or a mobile device (e.g., a smart phone, a smart watch, a tablet, etc.) communicative coupled to the host vehicle 100 via the on-board communications module 104.

The flowchart of FIG. 4 is representative of machine readable instructions stored in memory (such as the memory 306 of FIG. 3) that comprise one or more programs that, when executed by a processor (such as the processor 304 of FIG. 3), cause the vehicle 100 to implement the example image compositor 110 of FIGS. 1 and 3. Further, although the example program(s) is/are described with reference to the flowchart illustrated in FIG. 4, many other methods of implementing the example image compositor 110 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A method to generate an image of a host vehicle:
    determining, by a processor of the host vehicle, a pose of the host vehicle, the pose including an orientation of the host vehicle;
    receiving, at the host vehicle, an input to generate a composite image of the host vehicle in the determined pose;
    broadcasting, based on receiving the input to generate the composite image and via an inter-vehicle communication module of the host vehicle, a request to target vehicles for images of the host vehicle, the request including the pose;
    generating, with the processor, the composite image of the host vehicle in the determined pose based on the images;
    overlaying the composite image of the host vehicle in determined pose onto a three-dimensional model of a whole view of the host vehicle stored in memory of the host vehicle; and
    displaying, on a display of the host vehicle, the three-dimensional model of the whole view of the host vehicle with the overlaid composite image of the host vehicle in the determined pose;
    wherein the composite image of the host vehicle in the determined pose is an image of the host vehicle in the determined pose.

2. The method of claim 1, wherein generating the composite image of the host vehicle in the determined pose includes stitching the images together using a structure from motion technique.

3. The method of claim 1, including estimating a time to complete generating the composite image of the host vehicle in the determined pose.

4. The method of claim 3, wherein the time to complete generating the composite image of the host vehicle in the determined pose is based on a diversity of views of the host vehicle in the images and a rate at which the images are received.

5. The method of claim 3, further comprising: facilitating, via the display, changing a view angle of a scene with the three-dimensional model of the whole view of the host vehicle to generate a new composite image.

6. The method of claim 1, wherein the pose includes coordinates of the host vehicle, an orientation of the host vehicle, and at least one of a color of the host vehicle or a model of the host vehicle.

7. The method of claim 1, including displaying the composite image of the host vehicle in the determined pose when the composite image is partially completed as the images are received over time.

8. The method of claim 1, wherein the input to generate the composite image of the host vehicle in the determined pose is received by a human machine interface (HMI) of the host vehicle.

9. A vehicle comprising:
    an inter-vehicle communication module; and
    an infotainment head unit, including memory storing a three-dimensional model of a whole view of the vehicle configured to:
    determine a pose of the vehicle, the pose including an orientation of the vehicle;
    receiving, at the vehicle, an input to generate a composite image of the vehicle in the determined pose;
    broadcast, based on receiving the input to generate the composite image and via the inter-vehicle communication module of the vehicle, a request for images of the vehicle, the request including the pose;
    generate the composite image of the vehicle in the determined pose based on the images;
    overlay the composite image of the vehicle in the determined pose onto the three-dimensional model of the whole view of the vehicle; and
    display the three-dimensional model of the whole view of the vehicle with the overlaid composite image of the vehicle in the determined pose on a display;
    wherein the composite image of the vehicle in the determined pose is an image of the vehicle in the determined pose.

10. The vehicle of claim 9, wherein to generate the composite image of the vehicle in the determined pose, the infotainment head unit is to stitch the images together using a structure from motion technique.

11. The vehicle of claim 9, wherein the infotainment head unit is to estimate a time to complete generating the composite image of the vehicle in the determined pose.

12. The vehicle of claim 11, wherein the time to complete generating the composite image of the vehicle in the determined pose is based on a diversity of views of the vehicle in the images and a rate at which the images are received.

13. The vehicle of claim 9, wherein the infotainment head unit is to facilitate, via the display, changing a view angle of a scene with the three-dimensional model of the whole view of the vehicle to generate a new composite image.

14. The vehicle of claim 9, wherein the pose includes coordinates of the vehicle, an orientation of the vehicle, and at least one of a color of the vehicle or a model of the vehicle.

15. The vehicle of claim 9, wherein the infotainment head unit is to display the composite image when the composite image is partially completed as the images are received over time.

* * * * *